United States Patent [19]
Moschgat

[11] 3,872,472
[45] Mar. 18, 1975

[54] ULTRASONIC SYSTEM FOR REPELLING NOXIOUS FAUNA

[76] Inventor: Robert G. Moschgat, Shunnock Woods, North Stonington, Conn. 06359

[22] Filed: Dec. 11, 1973

[21] Appl. No.: 423,759

[52] U.S. Cl. ................ 340/384 E, 340/15, 43/124, 43/143, 331/78, 181/0.5 J, 116/137 A
[51] Int. Cl. ..................... A01m 29/00, G10k 10/00
[58] Field of Search ............. 340/384 R, 384 E, 15; 181/0.5 J, 0.5 R; 43/1, 124, 143; 116/137 R, 137 A; 331/78, 157, 155, 73, 141; 310/26

[56] References Cited
UNITED STATES PATENTS

| | | | |
|---|---|---|---|
| 3,058,103 | 10/1962 | Evans | 340/15 |
| 3,205,454 | 9/1965 | Lowe | 331/78 |
| 3,254,312 | 5/1966 | Weil | 331/78 |
| 3,305,824 | 2/1967 | Brooks et al. | 340/15 |
| 3,311,868 | 3/1967 | Cupp et al. | 340/384 E X |
| 3,503,039 | 3/1970 | Aniskovicz | 340/15 |
| 3,676,802 | 7/1972 | Murphree et al. | 340/384 E X |
| 3,683,113 | 8/1972 | Stewart | 340/384 E X |
| 3,747,092 | 7/1973 | Smith | 380/384 E |
| 3,795,873 | 3/1974 | Fein et al. | 331/78 |
| 3,810,039 | 5/1974 | Fein | 331/78 |

*Primary Examiner*—John W. Caldwell
*Assistant Examiner*—William M. Wannisky

[57] ABSTRACT

An ultrasonic system for intermittently producing pulses of energy for permanently repelling rats and other noxious fauna. The system includes a voltage-controlled oscillator capable of generating an ultrasonic signal whose frequency lies within a range to which noxious fauna are highly sensitive. Means are provided to apply voltages intermittently to the oscillator to produce an output signal whose frequency depends on the applied voltage and to convey this signal for a brief period to one or more ultrasonic transducers arranged to irradiate an infested area, the applied voltages having random values whereby each radiated pulse of energy has a different frequency and rats exposed to the ultrasonic pulses are unable to acquire deaf immunity.

11 Claims, 2 Drawing Figures

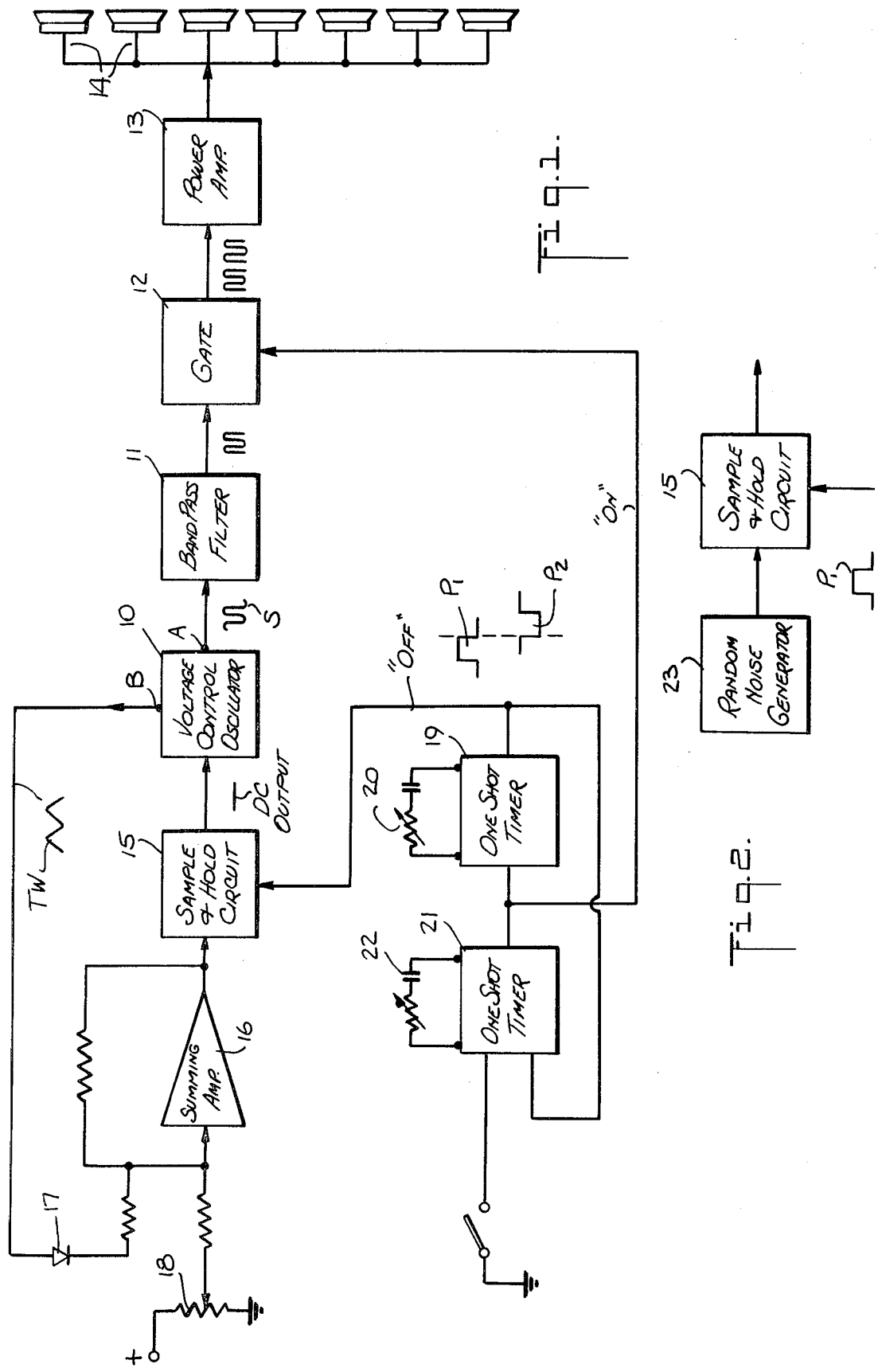

ULTRASONIC SYSTEM FOR REPELLING NOXIOUS FAUNA

BACKGROUND OF THE INVENTION

This invention relates generally to ultrasonic systems for repelling rodents, birds, insects and other pests, and more particularly to a system which radiates ultrasonic energy in a random manner which acts to permanently repel noxious fauna.

Mice and rats have long been recognized as disease carriers and as extremely dangerous and destructive pests. Indeed the common rat has been called the most injurious and universal pest of the human race. Rats, for example, are responsible for heavy damage to foodstuffs in storage area.

One known technique for repelling rodents and other pests involves the radiation of ultrasonic energy. Thus in the U.S. Pat. No. 2,922,999 to Carlin, a directional beam of high intensity ultrasonic energy is produced to scare away noxious fauna without in any way disturbing human beings.

Most humans are responsive to sounds ranging in frequency between about 20 Hz and 17 KHz, although some individuals can hear somewhat higher frequencies. In humans the frequency range of greatest sensitivity is considered to be about 1 to 4 KHz. Rats and mice on the other hand are responsive to frequencies well above the upper level for humans, the range of greatest sensitivity being about 22 to 30 KHz. Smaller pests, such as mosquitos and cockroaches apparently are capable of hearing sound having a much higher frequency.

It has been determined that rats may be put under severe conditions of stress when subjected to ultrasonic energy in the range of 18 KHz to 30 KHz, and will make a strenuous effort to flee such intolerable sound waves. Known ultrasonic systems for repelling pigeons, rats, insects and other pests, such as the systems disclosed in U.S. Pat. Nos. 3,058,103, 3,277,861, 3,503,039 and 3,636,559 have exploited this phenomenon and have employed ultrasonic sound generators to irradiate an infested area. It has been found that the sounds produced by known systems in causing the animals to withdraw from a given area have only a temporary effect.

The repellant effect of ultrasonic energy having a predetermined frequency is generally short-lived, for after a period of time, the rats or other animals will re-enter the irradiated area. If, however, the frequency of the ultrasonic energy is changed, the pests will generally be again repelled for a relatively short period and then reappear. The reason why this happens is that prolonged exposure to a given sound frequency renders the animal effectively deaf or immune to that sound. This phenomenon is sometimes referred to as "slotted deafness" or "deafness immunity."

Because of such immunity, an ultra-high frequency sound which is initially effective as a repellant will gradually begin to lose it effectiveness. In order to overcome the undesirable effects of deafness immunity, attempts have been made to constantly vary the frequency of the radiated energy. But because such variations in frequency are regular with respect to time, the rodents are able to accommodate themselves to such radiation and tend to reappear.

SUMMARY OF THE INVENTION

In view of the foregoing, it is the main object of this invention to provide a system for generating ultrasonic energy for permanently repelling noxious fauna.

More specifically, it is an object of this invention to provide a system of the above-noted type in which pulses of ultrasonic energy are intermittently radiated, the pulses having frequencies which vary in a random manner.

Also an object of this invention is to provide a simple, efficient, reliable and low-cost system for radiating pulses of ultrasonic energy frequencies which vary in a random manner whereby rats and other noxious fauna are unable to acquire immunity to the sounds, as a result of which the fauna, once repelled from the irradiated area, remain permanently absent therefrom.

It is to be noted that once a colony of rats has been repelled from an infested area, such as the store-room of a supermarket, they will seek another habitat. If this newly-selected habitat is also rat-infested, the invading rats will be attacked by the rats already living in this habitat. This behavior of rats is well established, and is reported for example in the article entitled "Rats" appearing in the January, 1967 issue of the Scientific American (pages 78–85).

Also an object of this invention is to provide a system of the above-type in which the generation of pulses is intermittent rather than periodic, in which the duration of each pulse varies somewhat from pulse to pulse, and in which the frequency of ultrasonic energy in each pulse undergoes change in the course of the pulse as well as being unrelated to the frequency or frequencies of subsequent pulses whereby it is virtually impossible for rats or other fauna subjected to the pulses to accomodate themselves to the radiated energy.

Briefly stated, these objects are accomplished in a system including a voltage-controlled oscillator which is capable of generating an ultrasonic signal whose frequency lies within a frequency range to which noxious fauna are highly sensitive, means being provided to apply voltage intermittently to the oscillator to produce an output signal whose frequency depends on the applied voltage and to convey the signal for a brief period to one or more ultrasonic transducers arranged to irradiate an infested area, the applied voltages having random values whereby each radiated pulse of energy has a different frequency whereby rats exposed thereto are unable to acquire deaf immunity.

OUTLINE OF THE DRAWINGS

For a better understanding of the invention as well as other objects and further features thereof, reference is made to the following detailed description to be read in conjunction with the accompanying drawing wherein:

FIG. 1 is a block diagram of one preferred embodiment of an ultrasonic system for repelling noxious fauna, and FIG. 2 is a block diagram of another preferred embodiment of the invention.

DESCRIPTION OF THE INVENTION

Referring now to the drawing and more particularly to FIG. 1, there is illustrated an ultrasonic system in accordance with the invention, the system including a voltage-controlled oscillator 10 (V-C-O) whose output signal is applied through a band-pass filter 11 to an electronic gate or analog switch 12 which is normally blocked but which when opened, applies the signal to a power amplifier 13 coupled to a group of ultrasonic transducers 14.

Voltage-controlled oscillator 10 is preferably of type 8038 manufactured by Intersil Inc., of Cupertino Calif., and described in the instruction bulletin published by this company. This oscillator is in the form of a monolithic integrated circuit waveform generator capable of producing, in response to an applied voltage, both a sinusoidal and a triangular wave whose frequency is a function of the applied voltage. The sinusoidal output voltage S derived from output terminal A is applied to band-pass filter 11 which is designed to pass frequencies in the range of interest which is 18.2 to 30 KHz, and to attenuate all other frequencies.

The input voltage applied to V-C-O 10 is within a band of magnitude value such as to produce an ultrasonic signal within the desired 18.2 to 30 KHz ultrasonic range, for mice and rats are highly sensitive to sound in this range. The invention is by no means limited to the specified range, for when the system is to be used say with insects which undergo stress at even higher frequencies, the operating range is set accordingly.

The input voltage for V-C-O 10 is derived from a sample and hold amplifier 15, preferably of the S/H 725 type manufactured by Hybrid Systems Corp. of Burlington, Mass. and described in their instruction bulletin. This amplifier is in the form of a compact module which when rendered operative by a control pulse, receives an input voltage of changing amplitude, the amplitude value of this voltage at the conclusion or trailing edge of the control pulse being held until such time as another control pulse appears. Thus if the voltage during the control pulse interval varies between +0.2 to +0.8 V and the voltage at the conclusion of the control pulse is +0.6 V, then the 0.6 V value will be held.

A significant feature of this module is its leakage characteristic such that after a predetermined interval (i.e., 25 milliseconds) the held voltage is caused to droop. If therefore, the held voltage at the outset is say +0.8 V, it will thereafter droop a few millivolts. Hence the voltage applied to V-C-O 10 at the conclusion of the control pulse will first be +0.8 V and it will later fall slightly with a resultant sharp increase in the frequency of the ultrasonic signal. This increase in frequency will be translated by the ultrasonic transducers 14 into a "whoop" that is highly annoying to rodents.

The input voltage for sample and hold amplifier 15 is derived from the output of a summing amplifier 16 to whose inputs are applied the triangular wave TW taken from terminal B of V-C-O through diode 17 and a constant d-c voltage taken from the tap of a potentiometer 18 connected to a d-c source. Thus the varying output of summing amplifier 16 is the arithmetic sum of the constant d-c voltage and the triangular voltage.

The value held in the sample and hold amplifier 15 at the conclusion of the control pulse applied thereto is not predictable, for this control pulse is derived from a monostable one shot timer 19 whose operation is independent of V-C-O 10. A monostable multivibrator has one stable state and one unstable state. A trigger or threshold signal is required to drive the unit into the unstable state where it remains for a predetermined time before returning to the stable state. A monostable timer is a monostable multivibrator having controls for adjusting the time duration of the output pulse. In the present invention, the threshold point is adjustable by means of an R-C charging network 20 having a variable resistor. This is to say, each time the capacitor charge attains a given level, it triggers the multivibrator, causing the capacitor to discharge after which the capacitor proceeds to recharge to repeat the cycle.

The operation of the monostable timer is altogether independent of the frequency of V-C-O 10; hence the output pulse $P_1$ of this timer which acts as the control pulse for operating the sample and hold amplifier 15 has a trailing edge whose position in time is unrelated to the triangular wave TW generated by V-C-O 10.

Since sample and hold amplifier 15 holds whatever voltage value is applied thereto at the conclusion or trailing edge of pulse $P_1$ and this held value is derived from triangular wave TW which is unrelated to pulse $P_1$, this held value may, for example, at the conclusion of one pulse $P_1$ be relatively large because at that instant the triangular wave is at its peak. But at the conclusion of the subsequent control pulse $P_1$, which takes place after as many as 200 cycles of triangular wave TW have been generated by V-C-O 10, the held value may be small because the triangular wave may then be close to its trough. From pulse to pulse, a new held value will be established, the various values being entirely random.

At the conclusion of control pulse $P_1$, there is produced by means of a second one-shot timer 21 having an adjustable R-C charge network 22, a second control pulse $P_2$. The leading edge of pulse $P_2$ is concident with the trailing edge of pulse $P_1$, this being accomplished by connecting timers 19 and 21 in tandem relation. Pulse $P_2$ is applied as a control pulse to normally closed electronic gate 12 to open the gate and pass the ultrasonic signal to power amplifier 13. As a consequence, during the period when the frequency of the output signal of V-C-O 10 is determined by the random value applied thereto by the sample and hold amplifier, this signal is applied to power amplifier 13 whose output is fed to transducers 14.

These ultrasonic transducers are preferably of the piezoelectric type produced by the MASSA Division of Dynamics Corporation of America, Hingham, Mass., such as MASSA type MS–3 which is a sealed unit supplied with a plug-in receptacle. The transducers may be installed in a suitable array along the ceiling of the infested area to be irradiated or at other points in this area so as to effectively inundate the area with high intensity ultrasonic pulses of random frequency which are intolerable to rodents and cause them to flee the area.

The operation of the timers may also be made to be random by circuits known in the art whereby not only does each radiated pulse contain an ultrasonic signal of random frequency, but the duration of each radiated pulse is different and the rate of radiation is randomly intermittent rather than periodic. Thus the rodents subjected to the intermittent pulses of random frequency are unable to accommodate themselves to the intolerable sounds and will seek to withdraw from the area.

In the arrangement shown in FIG. 2, the system is essentially the same as that in FIG. 1 except that instead of applying to the sample and hold amplifier 15 a triangular voltage derived from V-C-O 10, the voltage applied thereto is derived from a random noise generator 23, the value held by the amplifier being that voltage established at the conclusion of control pulse $P_1$.

Thus while there has been shown preferred embodiments of the invention it will be appreciated that many changes and modifications may be made without, however, departing from the essential spirit of the invention.

We claim:

1. An electronic system for permanently repelling rodents and other forms of noxious fauna, said system comprising:
  A. means including a voltage-controlled oscillator to produce an ultrasonic signal whose frequency lies in a range above the human hearing range to which the fauna are highly sensitive;
  B. at least one ultrasonic transducer,
  C. means intermittently to apply said signal from said oscillator to said transducer for brief intervals whereby pulses of ultrasonic energy are radiated by the transducer; and
  D. means to apply to said oscillator during said intervals held voltages having random values, said oscillator thus generating a signal of ultrasonic pulses having random frequencies such that rodents and other noxious fauna are unable to acquire deafness immunity.

2. A system as set forth in claim 1, wherein said means to apply said signal to said transducer includes an electronic gate which is opened intermittently by a one-shot timer.

3. A system as set forth in claim 1, wherein said transducer is a piezoelectric transducer.

4. A system as set forth in claim 1, wherein said means to apply random voltages to said oscillator includes a sample and hold amplifier having a varying voltage applied as an input thereto, and a one-shot timer applying control pulses to said amplifier, the operation of the timer being independent of the frequency of the oscillator.

5. A system as set forth in claim 4, wherein said varying voltage applied to said amplifier is derived from a random noise generator.

6. A system as set forth in claim 4, wherein said voltage-controlled oscillator also produces a triangular wave which is applied to a summing amplifier where it is combined with a constant voltage to yield said varying voltage.

7. A system as set forth in claim 1, further including a band-pass filter interposed between said oscillator and said transducer whereby the signal applied to said transducer is within said range.

8. A system as set forth in claim 1, wherein said held voltage changes in value in the course of said intervals to produce a whoop in the frequency of the pulses.

9. A system as set forth in claim 4, wherein said sample and hold amplifier has a leakage characteristic to cause said held voltage to change in value in the course of said intervals to produce a whoop in the frequency of the pulses.

10. A system as set forth in claim 1, wherein said intermittent pulses are of random duration.

11. A system as set forth in claim 1, wherein said intermittent pulses are aperiodic.

* * * * *